United States Patent
Shioya

[11] Patent Number: 6,012,798
[45] Date of Patent: *Jan. 11, 2000

[54] RECORDING METHOD AND APPARATUS IN WHICH COMPLEMENTARY IMAGES ARE RECORDED WITH NON-PARALLEL DRIVE SETS

[75] Inventor: Makoto Shioya, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/831,956

[22] Filed: Apr. 2, 1997

Related U.S. Application Data

[63] Continuation of application No. 08/123,792, Sep. 20, 1993, abandoned.

[30] Foreign Application Priority Data

Sep. 24, 1992 [JP] Japan ................................ 4-254470

[51] Int. Cl.⁷ ................................ B41J 2/15; B41J 29/38
[52] U.S. Cl. ................................ 347/41; 347/12; 347/39
[58] Field of Search .................... 347/41, 40, 39, 347/37, 12, 15, 233, 234, 211; 400/323, 323.1; 395/105, 108

[56] References Cited

U.S. PATENT DOCUMENTS

| | | |
|---|---|---|
| 4,069,485 | 1/1978 | Martin . |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,509,058 | 4/1985 | Fischbeck ................. 347/39 |
| 4,520,368 | 5/1985 | Ims ............................ 347/39 |
| 4,521,123 | 6/1985 | Boehmer . |
| 4,558,333 | 12/1985 | Sugitani et al. . |
| 4,594,598 | 6/1986 | Iwagami ...................... 347/37 |
| 4,608,577 | 8/1986 | Hori . |
| 4,723,129 | 2/1988 | Endo et al. . |
| 4,740,796 | 4/1988 | Endo et al. . |
| 4,967,203 | 10/1990 | Doan et al. . |
| 4,999,646 | 3/1991 | Trask ......................... 347/41 |

FOREIGN PATENT DOCUMENTS

| | | |
|---|---|---|
| 0076948 | 4/1983 | European Pat. Off. . |
| 0518670 | 12/1992 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 2251581 | 7/1992 | United Kingdom . |
| WO90014957 | 12/1990 | WIPO . |

*Primary Examiner*—David F. Yockey
*Attorney, Agent, or Firm*—Fitzpatrick, Cella, Harper & Scinto

[57] ABSTRACT

A recording method and apparatus in which a recording head is driven, moved or scanned a plurality of sets of times in corresponding sets of drive directions relative to a recording medium. At least one of the drive directions in a corresponding drive set is non-parallel to the other drive direction in the corresponding drive set, such that the recording head records portions of the image in a plurality of swaths and the image is completely recorded on the recording medium in an area where the plurality of swaths cross.

43 Claims, 13 Drawing Sheets

FIG. 4A

MOVEMENT OF CARRIAGE ←→

ROTATION OF DRUM ↑

```
0123456789ABCDEF0123456789ABCDEF0123456789ABCDEF0123456789ABCDEF
0123456789ABCDEF0123456789ABCDEF0123456789ABCDEF0123456789ABCDEF
EF0123456789ABCDEF0123456789ABCDEF0123456789ABCDEF0123456789ABCD
23456789ABCDEF0123456789ABCDEF0123456789ABCDEF0123456789ABCDEF01
CDEF0123456789ABCDEF0123456789ABCDEF0123456789ABCDEF0123456789AB
456789ABCDEF0123456789ABCDEF0123456789ABCDEF0123456789ABCDEF0123
ABCDEF0123456789ABCDEF0123456789ABCDEF0123456789ABCDEF0123456789
6789ABCDEF0123456789ABCDEF0123456789ABCDEF0123456789ABCDEF012345
89ABCDEF0123456789ABCDEF0123456789ABCDEF0123456789ABCDEF01234567
89ABCDEF0123456789ABCDEF0123456789ABCDEF0123456789ABCDEF01234567
6789ABCDEF0123456789ABCDEF0123456789ABCDEF0123456789ABCDEF012345
ABCDEF0123456789ABCDEF0123456789ABCDEF0123456789ABCDEF0123456789
456789ABCDEF0123456789ABCDEF0123456789ABCDEF0123456789ABCDEF0123
CDEF0123456789ABCDEF0123456789ABCDEF0123456789ABCDEF0123456789AB
23456789ABCDEF0123456789ABCDEF0123456789ABCDEF0123456789ABCDEF01
EF0123456789ABCDEF0123456789ABCDEF0123456789ABCDEF0123456789ABCD
0123456789ABCDEF0123456789ABCDEF0123456789ABCDEF0123456789ABCDEF
0123456789ABCDEF0123456789ABCDEF0123456789ABCDEF0123456789ABCDEF
EF0123456789ABCDEF0123456789ABCDEF0123456789ABCDEF0123456789ABCD
23456789ABCDEF0123456789ABCDEF0123456789ABCDEF0123456789ABCDEF01
CDEF0123456789ABCDEF0123456789ABCDEF0123456789ABCDEF0123456789AB
456789ABCDEF0123456789ABCDEF0123456789ABCDEF0123456789ABCDEF0123
ABCDEF0123456789ABCDEF0123456789ABCDEF0123456789ABCDEF0123456789
6789ABCDEF0123456789ABCDEF0123456789ABCDEF0123456789ABCDEF012345
89ABCDEF0123456789ABCDEF0123456789ABCDEF0123456789ABCDEF01234567
89ABCDEF0123456789ABCDEF0123456789ABCDEF0123456789ABCDEF01234567
6789ABCDEF0123456789ABCDEF0123456789ABCDEF0123456789ABCDEF012345
ABCDEF0123456789ABCDEF0123456789ABCDEF0123456789ABCDEF0123456789
456789ABCDEF0123456789ABCDEF0123456789ABCDEF0123456789ABCDEF0123
CDEF0123456789ABCDEF0123456789ABCDEF0123456789ABCDEF0123456789AB
23456789ABCDEF0123456789ABCDEF0123456789ABCDEF0123456789ABCDEF01
EF0123456789ABCDEF0123456789ABCDEF0123456789ABCDEF0123456789ABCD
```

FIG. 4B

MOVEMENT OF CARRIAGE →

ROTATION OF DRUM ↑

```
0123456789ABCDEF  ODD LINE
 0123456789ABCDEF  ODD LINE
  0123456789ABCDEF  ODD LINE
   0123456789ABCDEF  ODD LINE
    0123456789ABCDEF  ODD LINE
```

FIG. 4C

MOVEMENT OF CARRIAGE ←

ROTATION OF DRUM ↑

```
    0123456789ABCDEF  EVEN LINE
   0123456789ABCDEF  EVEN LINE
  0123456789ABCDEF  EVEN LINE
 0123456789ABCDEF  EVEN LINE
0123456789ABCDEF  EVEN LINE
```

FIG. 5

MOVEMENT OF CARRIAGE ←→

ROTATION OF DRUM ↑

```
0123456789ABCDEF0123456789ABCDEF0123456789ABCDEF0123456789ABCDEF
123456789ABCDEF0123456789ABCDEF0123456789ABCDEF0123456789ABCDEF0
EF0123456789ABCDEF0123456789ABCDEF0123456789ABCDEF0123456789ABCD
3456789ABCDEF0123456789ABCDEF0123456789ABCDEF0123456789ABCDEF012
CDEF0123456789ABCDEF0123456789ABCDEF0123456789ABCDEF0123456789AB
56789ABCDEF0123456789ABCDEF0123456789ABCDEF0123456789ABCDEF01234
ABCDEF0123456789ABCDEF0123456789ABCDEF0123456789ABCDEF0123456789
789ABCDEF0123456789ABCDEF0123456789ABCDEF0123456789ABCDEF0123456
89ABCDEF0123456789ABCDEF0123456789ABCDEF0123456789ABCDEF01234567
9ABCDEF0123456789ABCDEF0123456789ABCDEF0123456789ABCDEF012345678
6789ABCDEF0123456789ABCDEF0123456789ABCDEF0123456789ABCDEF012345
BCDEF0123456789ABCDEF0123456789ABCDEF0123456789ABCDEF0123456789A
456789ABCDEF0123456789ABCDEF0123456789ABCDEF0123456789ABCDEF0123
DEF0123456789ABCDEF0123456789ABCDEF0123456789ABCDEF0123456789ABC
23456789ABCDEF0123456789ABCDEF0123456789ABCDEF0123456789ABCDEF01
F0123456789ABCDEF0123456789ABCDEF0123456789ABCDEF0123456789ABCDE
0123456789ABCDEF0123456789ABCDEF0123456789ABCDEF0123456789ABCDEF
123456789ABCDEF0123456789ABCDEF0123456789ABCDEF0123456789ABCDEF0
EF0123456789ABCDEF0123456789ABCDEF0123456789ABCDEF0123456789ABCD
3456789ABCDEF0123456789ABCDEF0123456789ABCDEF0123456789ABCDEF012
CDEF0123456789ABCDEF0123456789ABCDEF0123456789ABCDEF0123456789AB
56789ABCDEF0123456789ABCDEF0123456789ABCDEF0123456789ABCDEF01234
ABCDEF0123456789ABCDEF0123456789ABCDEF0123456789ABCDEF0123456789
789ABCDEF0123456789ABCDEF0123456789ABCDEF0123456789ABCDEF0123456
89ABCDEF0123456789ABCDEF0123456789ABCDEF0123456789ABCDEF01234567
9ABCDEF0123456789ABCDEF0123456789ABCDEF0123456789ABCDEF012345678
6789ABCDEF0123456789ABCDEF0123456789ABCDEF0123456789ABCDEF012345
BCDEF0123456789ABCDEF0123456789ABCDEF0123456789ABCDEF0123456789A
456789ABCDEF0123456789ABCDEF0123456789ABCDEF0123456789ABCDEF0123
DEF0123456789ABCDEF0123456789ABCDEF0123456789ABCDEF0123456789ABC
23456789ABCDEF0123456789ABCDEF0123456789ABCDEF0123456789ABCDEF01
F0123456789ABCDEF0123456789ABCDEF0123456789ABCDEF0123456789ABCDE
```

FIG. 6A

MOVEMENT OF CARRIAGE →

ROTATION OF DRUM ↑

```
0123456789ABCDEF0123456789ABCDEF0123456789ABCDEF0123456789ABCDEF
0123456789ABCDEF0123456789ABCDEF0123456789ABCDEF0123456789ABCDEF
0123456789ABCDEF0123456789ABCDEF0123456789ABCDEF0123456789ABCDEF
EF0123456789ABCDEF0123456789ABCDEF0123456789ABCDEF0123456789ABCD
0123456789ABCDEF0123456789ABCDEF0123456789ABCDEF0123456789ABCDEF
CDEF0123456789ABCDEF0123456789ABCDEF0123456789ABCDEF0123456789AB
0123456789ABCDEF0123456789ABCDEF0123456789ABCDEF0123456789ABCDEF
ABCDEF0123456789ABCDEF0123456789ABCDEF0123456789ABCDEF0123456789
0123456789ABCDEF0123456789ABCDEF0123456789ABCDEF0123456789ABCDEF
89ABCDEF0123456789ABCDEF0123456789ABCDEF0123456789ABCDEF01234567
0123456789ABCDEF0123456789ABCDEF0123456789ABCDEF0123456789ABCDEF
6789ABCDEF0123456789ABCDEF0123456789ABCDEF0123456789ABCDEF012345
0123456789ABCDEF0123456789ABCDEF0123456789ABCDEF0123456789ABCDEF
456789ABCDEF0123456789ABCDEF0123456789ABCDEF0123456789ABCDEF0123
0123456789ABCDEF0123456789ABCDEF0123456789ABCDEF0123456789ABCDEF
23456789ABCDEF0123456789ABCDEF0123456789ABCDEF0123456789ABCDEF01
0123456789ABCDEF0123456789ABCDEF0123456789ABCDEF0123456789ABCDEF
0123456789ABCDEF0123456789ABCDEF0123456789ABCDEF0123456789ABCDEF
0123456789ABCDEF0123456789ABCDEF0123456789ABCDEF0123456789ABCDEF
EF0123456789ABCDEF0123456789ABCDEF0123456789ABCDEF0123456789ABCD
0123456789ABCDEF0123456789ABCDEF0123456789ABCDEF0123456789ABCDEF
CDEF0123456789ABCDEF0123456789ABCDEF0123456789ABCDEF0123456789AB
0123456789ABCDEF0123456789ABCDEF0123456789ABCDEF0123456789ABCDEF
ABCDEF0123456789ABCDEF0123456789ABCDEF0123456789ABCDEF0123456789
0123456789ABCDEF0123456789ABCDEF0123456789ABCDEF0123456789ABCDEF
89ABCDEF0123456789ABCDEF0123456789ABCDEF0123456789ABCDEF01234567
0123456789ABCDEF0123456789ABCDEF0123456789ABCDEF0123456789ABCDEF
6789ABCDEF0123456789ABCDEF0123456789ABCDEF0123456789ABCDEF012345
0123456789ABCDEF0123456789ABCDEF0123456789ABCDEF0123456789ABCDEF
456789ABCDEF0123456789ABCDEF0123456789ABCDEF0123456789ABCDEF0123
0123456789ABCDEF0123456789ABCDEF0123456789ABCDEF0123456789ABCDEF
23456789ABCDEF0123456789ABCDEF0123456789ABCDEF0123456789ABCDEF01
```

FIG. 6B

MOVEMENT OF CARRIAGE →

ROTATION OF DRUM ↑

```
0123456789ABCDEF  ODD LINE
0123456789ABCDEF  ODD LINE
0123456789ABCDEF  ODD LINE
0123456789ABCDEF  ODD LINE
0123456789ABCDEF  ODD LINE
```

FIG. 6C

MOVEMENT OF CARRIAGE →

ROTATION OF DRUM ↑

```
0123456789ABCDEF  EVEN LINE
 0123456789ABCDEF  EVEN LINE
  0123456789ABCDEF  EVEN LINE
   0123456789ABCDEF  EVEN LINE
    0123456789ABCDEF  EVEN LINE
```

FIG. 7

MOVEMENT OF CARRIAGE →

ROTATION OF DRUM ↑

```
0123456789ABCDEF0123456789ABCDEF0123456789ABCDEF0123456789ABCDEF
F0123456789ABCDEF0123456789ABCDEF0123456789ABCDEF0123456789ABCDE
0123456789ABCDEF0123456789ABCDEF0123456789ABCDEF0123456789ABCDEF
DEF0123456789ABCDEF0123456789ABCDEF0123456789ABCDEF0123456789ABC
0123456789ABCDEF0123456789ABCDEF0123456789ABCDEF0123456789ABCDEF
BCDEF0123456789ABCDEF0123456789ABCDEF0123456789ABCDEF0123456789A
0123456789ABCDEF0123456789ABCDEF0123456789ABCDEF0123456789ABCDEF
9ABCDEF0123456789ABCDEF0123456789ABCDEF0123456789ABCDEF012345678
0123456789ABCDEF0123456789ABCDEF0123456789ABCDEF0123456789ABCDEF
789ABCDEF0123456789ABCDEF0123456789ABCDEF0123456789ABCDEF0123456
0123456789ABCDEF0123456789ABCDEF0123456789ABCDEF0123456789ABCDEF
56789ABCDEF0123456789ABCDEF0123456789ABCDEF0123456789ABCDEF01234
0123456789ABCDEF0123456789ABCDEF0123456789ABCDEF0123456789ABCDEF
3456789ABCDEF0123456789ABCDEF0123456789ABCDEF0123456789ABCDEF012
0123456789ABCDEF0123456789ABCDEF0123456789ABCDEF0123456789ABCDEF
123456789ABCDEF0123456789ABCDEF0123456789ABCDEF0123456789ABCDEF0
0123456789ABCDEF0123456789ABCDEF0123456789ABCDEF0123456789ABCDEF
F0123456789ABCDEF0123456789ABCDEF0123456789ABCDEF0123456789ABCDE
0123456789ABCDEF0123456789ABCDEF0123456789ABCDEF0123456789ABCDEF
DEF0123456789ABCDEF0123456789ABCDEF0123456789ABCDEF0123456789ABC
0123456789ABCDEF0123456789ABCDEF0123456789ABCDEF0123456789ABCDEF
BCDEF0123456789ABCDEF0123456789ABCDEF0123456789ABCDEF0123456789A
0123456789ABCDEF0123456789ABCDEF0123456789ABCDEF0123456789ABCDEF
9ABCDEF0123456789ABCDEF0123456789ABCDEF0123456789ABCDEF012345678
0123456789ABCDEF0123456789ABCDEF0123456789ABCDEF0123456789ABCDEF
789ABCDEF0123456789ABCDEF0123456789ABCDEF0123456789ABCDEF0123456
0123456789ABCDEF0123456789ABCDEF0123456789ABCDEF0123456789ABCDEF
56789ABCDEF0123456789ABCDEF0123456789ABCDEF0123456789ABCDEF01234
0123456789ABCDEF0123456789ABCDEF0123456789ABCDEF0123456789ABCDEF
3456789ABCDEF0123456789ABCDEF0123456789ABCDEF0123456789ABCDEF012
0123456789ABCDEF0123456789ABCDEF0123456789ABCDEF0123456789ABCDEF
123456789ABCDEF0123456789ABCDEF0123456789ABCDEF0123456789ABCDEF0
```

FIG. 8A

MOVEMENT OF CARRIAGE →

```
0123456789ABCDEF0123456789ABCDEF0123456789ABCDEF0123456789ABCDEF
0123456789ABCDEF0123456789ABCDEF0123456789ABCDEF0123456789ABCDEF
EF0123456789ABCDEF0123456789ABCDEF0123456789ABCDEF0123456789ABCD
CDEF0123456789ABCDEF0123456789ABCDEF0123456789ABCDEF0123456789AB
CDEF0123456789ABCDEF0123456789ABCDEF0123456789ABCDEF0123456789AB
89ABCDEF0123456789ABCDEF0123456789ABCDEF0123456789ABCDEF01234567
ABCDEF0123456789ABCDEF0123456789ABCDEF0123456789ABCDEF0123456789
456789ABCDEF0123456789ABCDEF0123456789ABCDEF0123456789ABCDEF0123
89ABCDEF0123456789ABCDEF0123456789ABCDEF0123456789ABCDEF01234567
0123456789ABCDEF0123456789ABCDEF0123456789ABCDEF0123456789ABCDEF
6789ABCDEF0123456789ABCDEF0123456789ABCDEF0123456789ABCDEF012345
CDEF0123456789ABCDEF0123456789ABCDEF0123456789ABCDEF0123456789AB
456789ABCDEF0123456789ABCDEF0123456789ABCDEF0123456789ABCDEF0123
89ABCDEF0123456789ABCDEF0123456789ABCDEF0123456789ABCDEF01234567
23456789ABCDEF0123456789ABCDEF0123456789ABCDEF0123456789ABCDEF01
456789ABCDEF0123456789ABCDEF0123456789ABCDEF0123456789ABCDEF0123
0123456789ABCDEF0123456789ABCDEF0123456789ABCDEF0123456789ABCDEF
0123456789ABCDEF0123456789ABCDEF0123456789ABCDEF0123456789ABCDEF
EF0123456789ABCDEF0123456789ABCDEF0123456789ABCDEF0123456789ABCD
CDEF0123456789ABCDEF0123456789ABCDEF0123456789ABCDEF0123456789AB
CDEF0123456789ABCDEF0123456789ABCDEF0123456789ABCDEF0123456789AB
89ABCDEF0123456789ABCDEF0123456789ABCDEF0123456789ABCDEF01234567
ABCDEF0123456789ABCDEF0123456789ABCDEF0123456789ABCDEF0123456789
456789ABCDEF0123456789ABCDEF0123456789ABCDEF0123456789ABCDEF0123
89ABCDEF0123456789ABCDEF0123456789ABCDEF0123456789ABCDEF01234567
0123456789ABCDEF0123456789ABCDEF0123456789ABCDEF0123456789ABCDEF
6789ABCDEF0123456789ABCDEF0123456789ABCDEF0123456789ABCDEF012345
CDEF0123456789ABCDEF0123456789ABCDEF0123456789ABCDEF0123456789AB
456789ABCDEF0123456789ABCDEF0123456789ABCDEF0123456789ABCDEF0123
89ABCDEF0123456789ABCDEF0123456789ABCDEF0123456789ABCDEF01234567
23456789ABCDEF0123456789ABCDEF0123456789ABCDEF0123456789ABCDEF01
456789ABCDEF0123456789ABCDEF0123456789ABCDEF0123456789ABCDEF0123
```

↑ ROTATION OF DRUM

FIG. 8B

MOVEMENT OF CARRIAGE →

```
0123456789ABCDEF  ODD LINE
 0123456789ABCDEF  ODD LINE
  0123456789ABCDEF  ODD LINE
   0123456789ABCDEF  ODD LINE
    0123456789ABCDEF  ODD LINE
```

↑ ROTATION OF DRUM

FIG. 8C

MOVEMENT OF CARRIAGE →

```
0123456789ABCDEF  EVEN LINE
 0123456789ABCDEF  EVEN LINE
  0123456789ABCDEF  EVEN LINE
   0123456789ABCDEF  EVEN LINE
    0123456789ABCDEF  EVEN LINE
```

↑ ROTATION OF DRUM

FIG. 10A

MOVEMENT OF CARRIAGE ←→

```
1122334455667788112233445566778811223344556677881122334455667788
1122334455667788112233445566778811223344556677881122334455667788
8213243546576871821324354657687182132435465768718213243546576871
2831425364758617283142536475861728314253647586172831425364758617
7384152637485162738415263748516273841526374851627384152637485162
3748516273841526374851627384152637485162738415263748516273841526
6475861728314253647586172831425364758617283142536475861728314253
4657687182132435465768718213243546576871821324354657687182132435
5566778811223344556677881122334455667788112233445566778811223344
5566778811223344556677881122334455667788112233445566778811223344
4657687182132435465768718213243546576871821324354657687182132435
6475861728314253647586172831425364758617283142536475861728314253
3748516273841526374851627384152637485162738415263748516273841526
7384152637485162738415263748516273841526374851627384152637485162
2831425364758617283142536475861728314253647586172831425364758617
8213243546576871821324354657687182132435465768718213243546576871
1122334455667788112233445566778811223344556677881122334455667788
1122334455667788112233445566778811223344556677881122334455667788
8213243546576871821324354657687182132435465768718213243546576871
2831425364758617283142536475861728314253647586172831425364758617
7384152637485162738415263748516273841526374851627384152637485162
3748516273841526374851627384152637485162738415263748516273841526
6475861728314253647586172831425364758617283142536475861728314253
4657687182132435465768718213243546576871821324354657687182132435
5566778811223344556677881122334455667788112233445566778811223344
5566778811223344556677881122334455667788112233445566778811223344
4657687182132435465768718213243546576871821324354657687182132435
6475861728314253647586172831425364758617283142536475861728314253
3748516273841526374851627384152637485162738415263748516273841526
7384152637485162738415263748516273841526374851627384152637485162
2831425364758617283142536475861728314253647586172831425364758617
8213243546576871821324354657687182132435465768718213243546576871
```

ROTATION OF DRUM ↓

FIG. 10B

MOVEMENT OF CARRIAGE →

```
            1 2 3 4 5 6 7 8
          1 2 3 4 5 6 7 8
        1 2 3 4 5 6 7 8
      1 2 3 4 5 6 7 8
    1 2 3 4 5 6 7 8
  1 2 3 4 5 6 7 8
1 2 3 4 5 6 7 8
1 2 3 4 5 6 7 8
```

ROTATION OF DRUM ↑

FIG. 10C

MOVEMENT OF CARRIAGE ←

```
  1 2 3 4 5 6 7 8
  1 2 3 4 5 6 7 8
  1 2 3 4 5 6 7 8
  1 2 3 4 5 6 7 8
 1 2 3 4 5 6 7 8
1 2 3 4 5 6 7 8
1 2 3 4 5 6 7 8
1 2 3 4 5 6 7 8
```

ROTATION OF DRUM ↑

FIG. 11A

MOVEMENT OF CARRIAGE ←→

ROTATION OF DRUM ↑

```
0123456789ABCDEF0123456789ABCDEF0123456789ABCDEF0123456789ABCDEF
F21436587A9CBED0F21436587A9CBED0F21436587A9CBED0F21436587A9CBED0
E30527496B8DAFC1E30527496B8DAFC1E30527496B8DAFC1E30527496B8DAFC1
D4F6183A5C7E90B2D4F6183A5C7E90B2D4F6183A5C7E90B2D4F6183A5C7E90B2
C5E7092B4D6F81A3C5E7092B4D6F81A3C5E7092B4D6F81A3C5E7092B4D6F81A3
B6D8FA1C3E507294B6D8FA1C3E507294B6D8FA1C3E507294B6D8FA1C3E507294
A7C9EB0D2F416385A7C9EB0D2F416385A7C9EB0D2F416385A7C9EB0D2F416385
98BADCFE1032547698BADCFE1032547698BADCFE1032547698BADCFE10325476
89ABCDEF0123456789ABCDEF0123456789ABCDEF0123456789ABCDEF01234567
7A9CBED0F21436587A9CBED0F21436587A9CBED0F21436587A9CBED0F2143658
6B8DAFC1E30527496B8DAFC1E30527496B8DAFC1E30527496B8DAFC1E3052749
5C7E90B2D4F6183A5C7E90B2D4F6183A5C7E90B2D4F6183A5C7E90B2D4F6183A
4D6F81A3C5E7092B4D6F81A3C5E7092B4D6F81A3C5E7092B4D6F81A3C5E7092B
3E507294B6D8FA1C3E507294B6D8FA1C3E507294B6D8FA1C3E507294B6D8FA1C
2F416385A7C9EB0D2F416385A7C9EB0D2F416385A7C9EB0D2F416385A7C9EB0D
1032547698BADCFE1032547698BADCFE1032547698BADCFE1032547698BADCFE
0123456789ABCDEF0123456789ABCDEF0123456789ABCDEF0123456789ABCDEF
F21436587A9CBED0F21436587A9CBED0F21436587A9CBED0F21436587A9CBED0
E30527496B8DAFC1E30527496B8DAFC1E30527496B8DAFC1E30527496B8DAFC1
D4F6183A5C7E90B2D4F6183A5C7E90B2D4F6183A5C7E90B2D4F6183A5C7E90B2
C5E7092B4D6F81A3C5E7092B4D6F81A3C5E7092B4D6F81A3C5E7092B4D6F81A3
B6D8FA1C3E507294B6D8FA1C3E507294B6D8FA1C3E507294B6D8FA1C3E507294
A7C9EB0D2F416385A7C9EB0D2F416385A7C9EB0D2F416385A7C9EB0D2F416385
98BADCFE1032547698BADCFE1032547698BADCFE1032547698BADCFE10325476
89ABCDEF0123456789ABCDEF0123456789ABCDEF0123456789ABCDEF01234567
7A9CBED0F21436587A9CBED0F21436587A9CBED0F21436587A9CBED0F2143658
6B8DAFC1E30527496B8DAFC1E30527496B8DAFC1E30527496B8DAFC1E3052749
5C7E90B2D4F6183A5C7E90B2D4F6183A5C7E90B2D4F6186A5C7E90B2D4F6183A
4D6F81A3C5E7092B4D6F81A3C5E7092B4D6F81A3C5E7092B4D6F81A3C5E7092B
3E507294B6D8FA1C3E507294B6D8FA1C3E507294B6D8FA1C3E507294B6D8FA1C
2F416385A7C9EB0D2F416385A7C9EB0D2F416385A7C9EB0D2F416385A7C9EB0D
1032547698BADCFE1032547698BADCFE1032547698BADCFE1032547698BADCFE
```

FIG. 11B

MOVEMENT OF CARRIAGE →

ROTATION OF DRUM ↑

```
0 2 4 6 8 A C E   ODD LINE
  1 3 5 7 9 B D F   EVEN LINE
0 2 4 6 8 A C E
  1 3 5 7 9 B D F
0 2 4 6 8 A C E
  1 3 5 7 9 B D F
0 2 4 6 8 A C E
  1 3 5 7 9 B D F
```

FIG. 11C

MOVEMENT OF CARRIAGE ←

ROTATION OF DRUM ↑

```
  1 3 5 7 9 B D F   ODD LINE
0 2 4 6 8 A C E   EVEN LINE
  1 3 5 7 9 B D F
0 2 4 6 8 A C E
  1 3 5 7 9 B D F
0 2 4 6 8 A C E
  1 3 5 7 9 B D F
0 2 4 6 8 A C E
```

ND APPARATUS IN
RECORDING METHOD AND APPARATUS IN WHICH COMPLEMENTARY IMAGES ARE RECORDED WITH NON-PARALLEL DRIVE SETS

This application is a continuation of application Ser. No. 08/123,792 filed Sep. 20, 1993, now abandoned.

BACKGROUND OF THE INVENTION

1. Field of the Invention

The present invention relates to a recording apparatus and a recording method for recording data by using a recording head having a plurality of recording elements.

2. Related Background Art

An ink jet system has been known as an example of a type of recording system. In this recording apparatus or method, one line recorded by the scan of a recording head is formed by a plurality of ink droplets discharged from one discharge port (or ejection orifice). As a result, if there is a variance in the direction of discharge of the ink droplet and the amount of discharge from discharge port to discharge port, a stripe (or banding) may run or irregularity of density may occur in the recorded image, which should be uniform. Namely, if there is a scatter in the ejecting direction of the ink droplets, the positions of dots formed on the record sheet are shifted and the stripe runs on the image. Further, when there is a variation in the amount of discharge of the ink droplets, the sizes and the densities of the dots formed on the record sheet scatter and irregularity of density occurs in the image.

As one of the approaches to solve the above problems, it has been proposed to manufacture a recording head with a high precision to minimize the scatter of the direction of discharge and the amount of discharge of the ink droplets from discharge port to discharge port, but it involves problems of high manufacturing cost and low manufacturing yield.

As an approach to solve the problem of the irregularity of density by software, it is effective to change the number of implanted ink droplets so as to compensate the irregularity in the amount of discharge from discharge port to discharge port, but the build-in of such means leads to a rise of system cost. In addition, even with such an approach, it is not very effective to reduce stripe and when the scatter of the amount of discharge of the ink droplets from discharge port to discharge port changes by aging, it is necessary to readjust the number of implanted ink droplets and the maintenance ability of the apparatus is lowered.

As another approach to solve the problems of the stripe and the irregular density, it has been proposed to form one line by ink droplets discharged from a plurality of discharge ports to reduce the scatter in the direction of discharge and the amount of discharge of the ink droplets, as disclosed in U.S. Pat. No. 4,967,203.

FIG. 12 illustrates that method. In a first scan, pixels (one pixel consists of four dots in the illustrated example) which are not adjacent in vertical and horizontal directions are recorded. Then, the record sheet is fed in a sub-scan direction (vertically in the illustrated example) by four discharge port lengths so that the remaining pixels not recorded in the first scan are recorded in the second scan.

In this method, since one line (lateral array of dots) is formed by using two discharge ports, the scatter in the direction of discharge is averaged so that the stripe is less visible. Where the scatter of the amount of discharge of the ink droplets from discharge port to discharge port has a normal distribution with a standard deviation σ, the scatter of the amount of implanted ink decreases to $\sigma/\sqrt{2}$. Since the scatter of the amount of ink between lines is recognized as a scatter of the image density, an image of smaller scatter of density is attained by this method.

In this method, however, since only two discharge ports are used to form one line along the direction of movement of the carriage, the effect to reduce the stripe and the irregularity is not sufficient. Further, depending on the image, such as one in which pixels to be recorded are arranged alternately, the stripe and the irregularity are not reduced at all. In order to enhance the effect of reducing the stripe and the irregularity, more discharge ports may be used to record one line but this significantly reduces the recording speed because one line must be recorded by a number of times of scans.

The above method is applicable to a binary recording method (in FIG. 12, one dot is recorded by one ink droplet). A recording method which suppresses the stripe and the irregularity in a multi-level recording method (in which one dot is recorded by two or more ink droplets) is disclosed in U.S. patent application Ser. No. 894,555 assigned to the assignee of the present invention.

FIG. 13 illustrates that method. It shows a method for recording 0 to 3 ink droplets per dot by using a recording head having 12 discharge ports.

As shown in FIG. 13, when the discharge ports #9–#12 are used in a first scan, a record sheet is transported in a sub-scan direction (vertically in FIG. 13) by four discharge port lengths, and in a second scan, data is recorded by using the discharge ports #5–#12. In this scan, a portion of the dots recorded by the discharge ports #5–#8 is overlapped with the dots recorded in the first scan.

Similarly, in a third scan, the data is recorded by using the discharge ports #1–#12. As a result, the record of a first region is completed, and second and third regions are sequentially completed in subsequent scans.

In this method, like the method disclosed in U.S. Pat. No. 4,967,203, since one line is formed by the ink droplets discharged from a plurality of discharge ports, the scatter in the direction of discharge and the amount of discharge of the ink droplets from discharge port to discharge port is reduced and the stripe and the irregularity are harder to occur. In this method, the pixels in one line are sequentially allotted to scans for recording. For example, FIG. 13 shows the scan number at which the ink is discharged to each pixel of the first region. As seen therefrom, the number of times of ink discharge is assigned to each pixel. In this method, even if the pixels to be recorded are arranged alternately, the stripe and the irregularity are improved because those pixels are sequentially recorded by different discharge ports, and it is superior to the recording method disclosed in U.S. Pat. No. 4,967,203.

However, in this method, since the number of different discharge ports used to record one line in the direction of movement of the carriage is three, the effect to reduce the stripe and the irregularity is not sufficient. Further, if the recording of one line is made by using more discharge ports to enhance the reduction effect, the recording speed is significantly lowered.

SUMMARY OF THE INVENTION

It is an object of the present invention to remove the above-mentioned drawbacks.

It is another object of the present invention to provide a recording apparatus and a recording method which attain a high quality image without lowering a recording speed.

It is still another object of the present invention to provide a recording apparatus and a recording method which substantially eliminate a stripe and an irregularity by increasing the number of different discharge ports which form one line, in each of two directions.

In accordance with one aspect of the present invention, there is provided a recording apparatus for recording an image on a record medium comprising a recording head having a plurality of recording elements for recording the image, drive means for relatively moving said recording head to said record medium, and control means for controlling said drive means to drive said recording head a plurality of times relative to said record medium to record the image by said recording head as said recording head is driven. The directions of relative drive in at least one set of the plurality of times of relative drives are non-parallel to each other.

In accordance with another aspect of the present invention, there is provided a recording method for recording an image on a record medium, comprising the steps of providing a recording head having a plurality of recording elements for recording the image, and driving said recording head relative to said record medium a plurality of times to record the image by said recording head in each of the plurality of times of relative drives. The directions of drives in at least one set of plurality of times of drives are non-parallel to each other.

In accordance with other aspect of the present invention, there is provided a recording apparatus for recording an image on a record medium comprising a recording head having a plurality of recording elements for recording the image, scan means for scanning said recording head relative to said record medium a plurality of times, said scan means causing crossing of a plurality of loci resulting from at least one set of scans of the plurality of relative scans of said recording heads, and control means for controlling said recording head to complete the recording by said at least one set of scans for a region of the loci crossed by said scan means.

In accordance with a further aspect of the present invention, there is provided a recording method for recording an image on a record medium, comprising the steps of providing a recording head having a plurality of recording elements, recording a locus resulting from scan by scanning said recording head relative-to said record medium, and recording a locus resulting from scan by scanning said recording head relative to said record medium to cause the locus to cross the locus resulted from said recording step. Thereby, recording is completed for a region of the crossed loci resulting from said recording steps.

In accordance with a still further aspect of the present invention, there is provided a recording method for recording an image on a record medium, comprising the steps of providing a recording head having a plurality of recording elements, dividing one image to be recorded on said recording medium into a plurality of sub-images, and recording each of the divided sub-image by scanning the sub-images in different direction for each sub-image.

In accordance with the present invention, there are regions in the recorded image which are recorded by non-parallel movement. The arrangement of the recording elements used for recording pixels of one region is shifted from the arrangement of the recording elements used for recording the pixels of another region. As a result, the number of different recording elements for sequentially or substantially sequentially recording the pixels in a predetermined direction can be increased.

By properly recording regions in a non-parallel direction, a predetermined recording direction may be set arbitrarily.

BRIEF DESCRIPTION OF THE DRAWINGS

FIGS. 4A to 4C show record results by the Embodiment 1.

FIG. 5 shows a record result by a modification of the Embodiment 1.

FIGS. 6A to 6C show record results by another modification of the Embodiment 1.

FIG. 7 shows a record result by a modification of the above modification.

FIGS. 8A to 8C show record results by a further modification of the Embodiment 1.

FIGS. 10A to 10C show record results by a recording method of an Embodiment 3 of the present invention.

FIGS. 11A to 11C show record results by a recording method of an Embodiment 4 of the present invention.

DETAILED DESCRIPTION OF THE PREFERRED EMBODIMENTS

Embodiments of the present invention are explained in detail with reference to the drawings.

<Embodiment 1>

Figure 1:
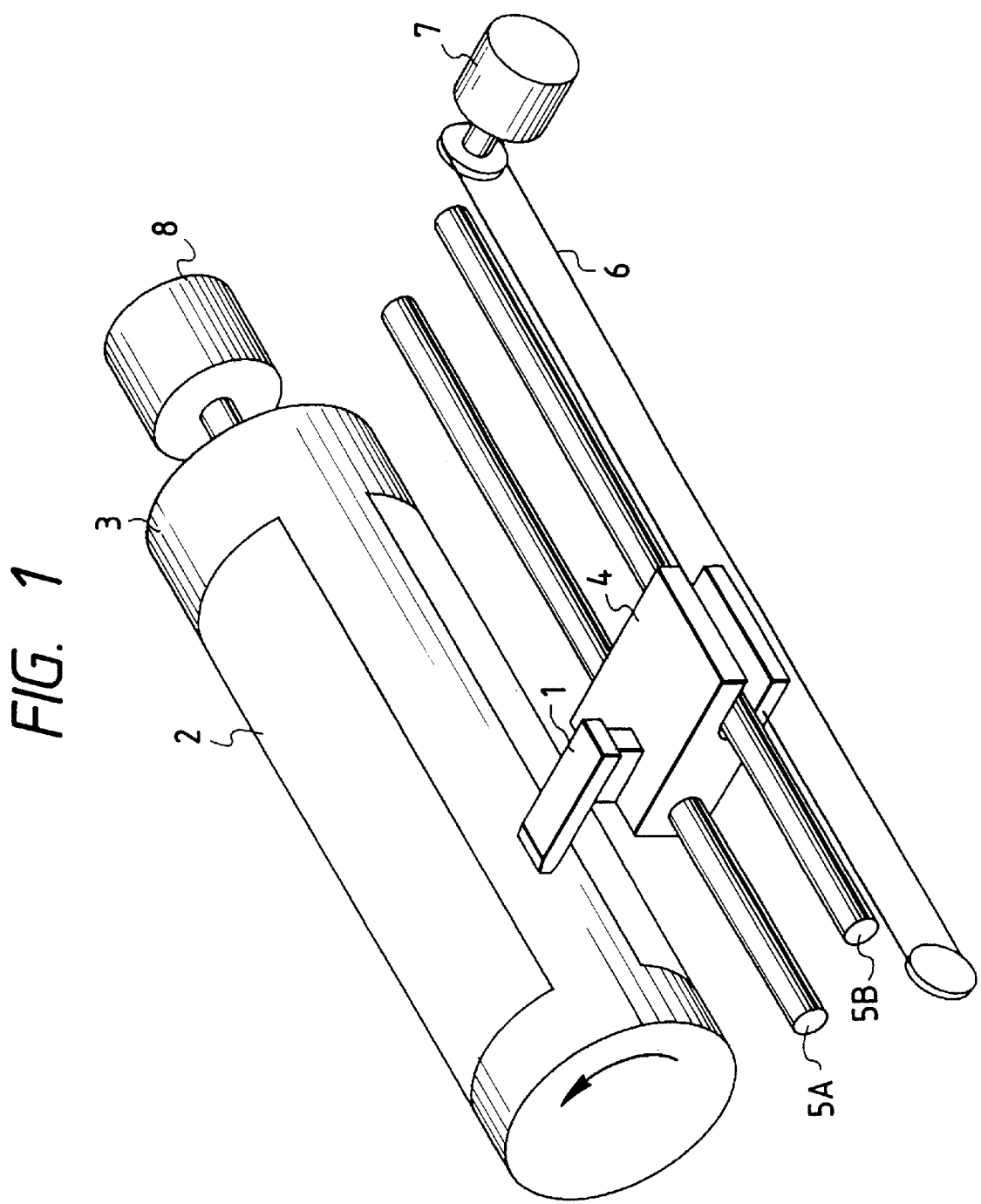
FIG. 1 shows a schematic perspective view of an ink jet recording apparatus in accordance with an embodiment of the present invention.

FIG. 1 shows a schematic perspective view of an ink jet recording apparatus in accordance with an embodiment of the present invention.

In FIG. 1, numeral 1 denotes a recording head having 16 discharge ports (or ejection orifices) arranged at a pitch of 16 ports/mm. A heater for generating a discharge energy is provided in each ink path connected to each discharge port. The heater generates heat in accordance with an applied electrical pulse to create film boiling in the ink. The ink is discharged from the discharge port as bubbles are created by the film boiling. In the present embodiment, a discharge frequency in each discharge port is 2 KHz.

Numeral 4 denotes a carriage which has the head 1 mounted thereon and is moved (scanned) while it is guided by two guide shafts 5A and 5B which engage with a portion of the carriage 4. The carriage 4 is connected to a portion of a belt 6 spanned in parallel to the guide shafts 5A and 5B and the carriage 4 is moved as the belt 6 is driven by a carriage motor 7. An ink supply tube (not shown) for supplying ink from an ink tank (not shown) and a flexible cable (not shown) for sending a drive signal and a control signal based on a record data from a control unit of the present apparatus are connected to the recording head 1. The ink supply tube and the flexible cable are made of flexible materials so that they can follow the movement of the carriage 4.

Numeral 2 denotes a record sheet which is wrapped around a drum 3 and held in contact with the drum 3 by electrostatic attraction. The drum 3 is rotated by a motor 8.

Figure 2:
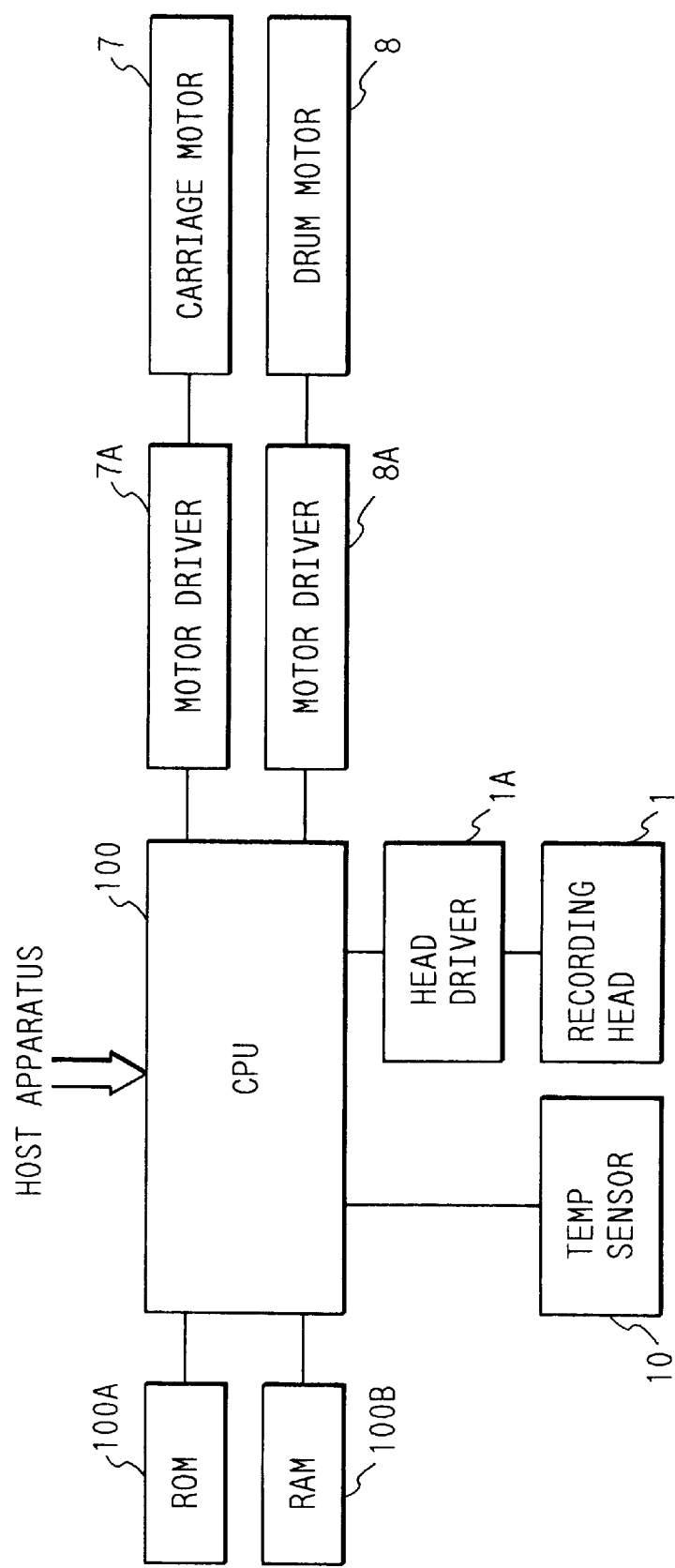
FIG. 2 shows a block diagram of a control unit of the apparatus shown in FIG. 1.

FIG. 2 shows a block diagram of a control unit of the ink jet recording apparatus shown in FIG. 1.

In FIG. 2, CPU 100 executes control of operations of respective units and processes data. A processing procedure is stored in a ROM 100A and a RAM 100B is used as a work area to execute the process.

The ink discharge in the recording head 1 is made by supplying from the CPU 100 drive data and a drive control signal for an electro-thermal transducer to a head driver 1A. In the present embodiment, the CPU 100 controls the rotation of the carriage motor 7 for moving the carriage 4 and the motor 8 for rotating the drum 3 through motor drives 7A and 8A, respectively, as will be described later.

Figure 3:
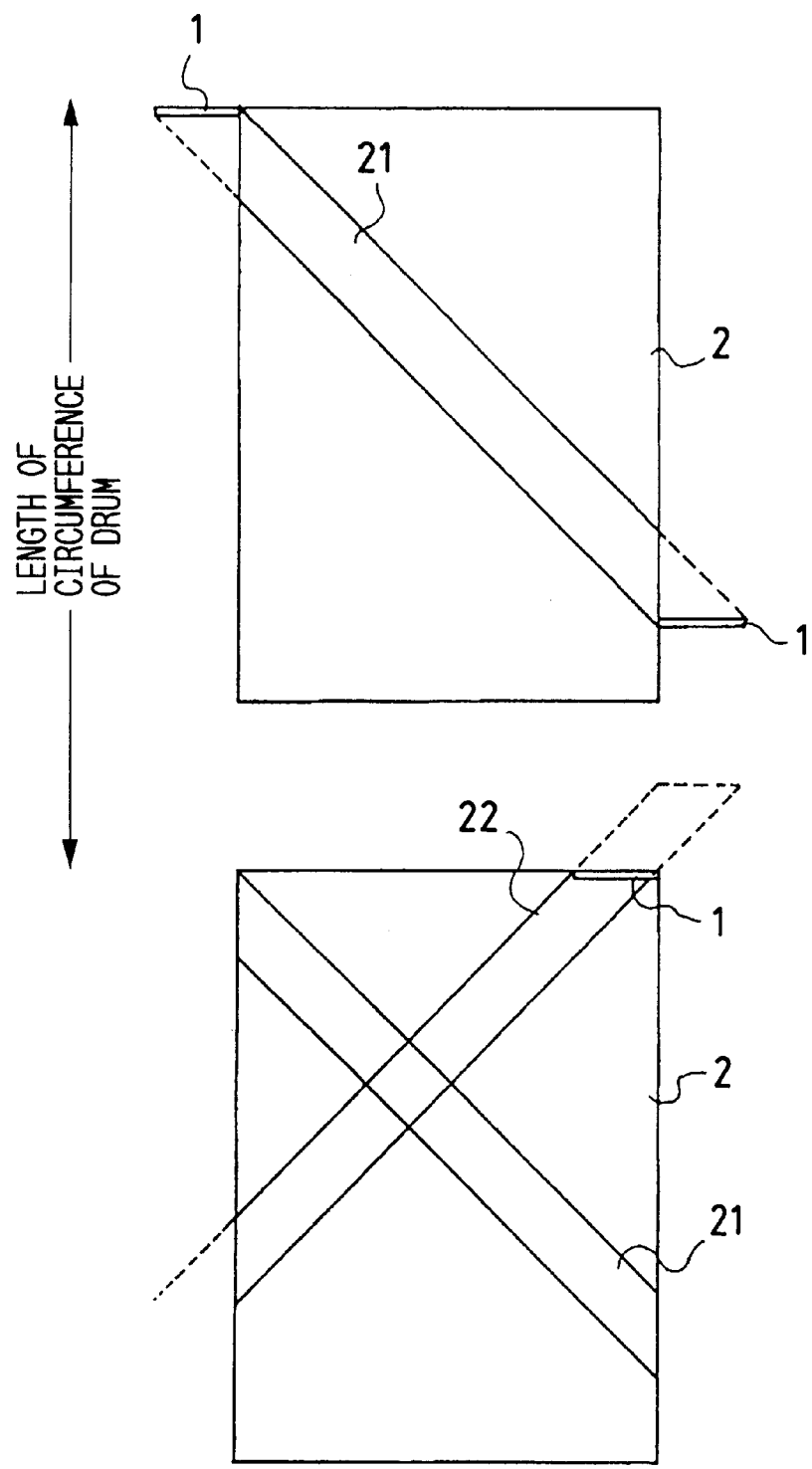
FIG. 3 illustrates a recording method in an Embodiment 1 of the present invention.

A recording method of the present embodiment which uses the ink jet recording apparatus described above is explained. FIGS. 3 to 4C show conceptual views for illustrating the recording method of the present embodiment. FIG. 3 shows a record sheet 2 wrapped around drum 3 into a plane, and FIGS. 4A to 4C show which discharge ports contribute to record each pixel on record sheet 2. In FIGS. 4A to 4C, 16 discharge ports are designated by reference numerals 0 to F.

In recording data, an image for an entire field is read and it is processed at an image density of 16 dots/mm. The processed data is then developed (image is divided) as discharge data for each discharge port in accordance with the following recording method.

The drum 3 is then rotated to move the record sheet 2 at a speed of 0.25 m/s and the recording head 1 is moved at a carriage speed of 0.25 m/s from a leftmost end to a rightmost end in FIG. 1 to record data. At this time, only those pixels which form odd numbered lines (sub-image) from the top of the record sheet 2 are recorded. As a result, as shown in FIG. 3, a record is made in a region 21 which obliquely crosses the record sheet. FIG. 4B shows a portion of the recorded pixels with the discharge port numbers used to discharge ink.

When the head 1 reaches the rightmost end of FIG. 1, the direction of movement of the carriage 4 is reversed so that it is moved to the left at a speed of 0.25 m/s to record even numbered lines (sub-image) from the top of the record sheet 2. The drum continues to rotate. As a result, as shown in FIG. 3, record is made in a region 22 which crosses the record region (scanned region) of the first scan on the record sheet and the pixels are recorded as shown in FIG. 4C.

Then, when the record head 1 reaches the leftmost end of FIG. 1, the same recording as that described above is repeated to complete the recording of the entire image.

As a result, the recorded pixels are arranged as shown in FIG. 4A. As seen from FIG. 4A, the image of one line in the direction of movement of the carriage is formed by ink droplets which are discharged from all discharge ports 0 to F of the recording head 1. Namely, the 16 sequential pixels are recorded by different discharge ports and this pattern is repeated. As a result, the scatter in the direction of discharge and the amount of discharge of the ink droplets from each discharge port is completely averaged. Thus, the reduction of the stripe (or banding) and the irregularity is sufficiently done and a high quality image is produced.

Further, since the 8 pixels in the vertical direction are also formed by the ink droplets discharged from the different discharge ports, the reduction of the stripe and the irregularity is made sufficient. As shown in FIG. 5, when recording of an even numbered line is to be made, the positions of the discharge ports may be shifted by one discharge port length in the direction of movement of the carriage (left in FIG. 5) from the positions for the recording of FIGS. 4A to 4C so that 16 sequential pixels in the vertical line are formed by the ink droplets discharged from 16 different discharge ports. In this manner, the stripe and the irregularity can be fully reduced.

The recording speed in the present embodiment is lower than that of the conventional recording method by a time required for the recording head to pass through a gap between the rear end and the front end of the record sheet created when the record sheet is mounted on the drum and a time required to reverse the direction of movement of the carriage at the right and left ends of the record sheet, but such reduction is not substantial. The reduction of the recording speed in the present embodiment is small compared to the reduction of the recording speed in forming one line by using a number of discharge ports in order to enhance the effect of reducing the stripe and the irregularity in U.S. Pat. No. 4,967,203 and U.S. patent application Ser. No. 894,555.

In the present embodiment, the two scanning directions are ±45° with respect to the record sheet as seen from FIG. 3 and they are orthogonal to each other, although other scanning angles may be used to reduce the stripe and the irregularity. For example, as shown in FIGS. 6A to 6C the odd numbered lines may be recorded parallel to one edge of the record sheet and the even numbered lines may be recorded at a 45° angle.

In this case, in order to increase the number of different discharge ports which form the vertical line and avoid a pattern shown in FIG. 6A in which three lines are formed by the same discharge ports at every 16 lines, the discharge ports may be shifted in recording the even numbered lines from the discharge ports for forming the odd numbered lines by one discharge port length in the direction of movement of the carriage (right in FIG. 6A) as shown in FIG. 7 so that the stripe and the irregularity are further reduced.

As shown in FIGS. 8A to 8C, the odd numbered lines may be recorded at a 45° degree angle to the record sheet and the even numbered lines may be recorded at a 26.6° degree (arctan ½) angle to the record sheet.

In the scanning methods shown in FIGS. 6A to 8C, the timing to move the carriage must be adjusted at the right and left ends of the record sheet (for example, the time to move the carriage is delayed until the appropriate record sheet position is reached) in order to align the position of the record sheet on the drum to the position of the head, and the recording speed is lowered. Accordingly, the scanning method of the present embodiment shown in FIG. 3 is preferable.

The recording method of the present invention not only prevents the occurrence of the vertical and horizontal stripes of the recorded image but also prevents the occurrence of the stripes in the scan direction by properly selecting the scan direction and using a number of discharge ports used in that direction.

While the drum is used in the present embodiment, the present invention is not limited thereto. The present invention may be applied to any apparatus in which the head is moved relative to the record sheet in a plurality of directions such as an apparatus in which the record sheet is moved vertically and the recording head is moved horizontally and an apparatus in which the record sheet is fixed in a plane and the recording head is moved thereon vertically and horizontally.

In the present embodiment, the record is completed by a plurality of scans by interpolating in a direction different from the direction of arrangement of the recording elements. Namely, the record is completed by using the sub-image created by dividing the entire image in alternating lines in a direction different from the direction of arrangement of the recording elements.

<Embodiment 2>

In the present embodiment, the identical apparatus to that of the Embodiment 1 is a used except that a different head from that of the Embodiment 1 is used. The recording head used in the present embodiment has 16 discharge ports, a discharge port density of 10 ports/mm and a discharges frequency of 4 KHz and discharges smaller ink droplets than those in the Embodiment 1.

Figure 9:
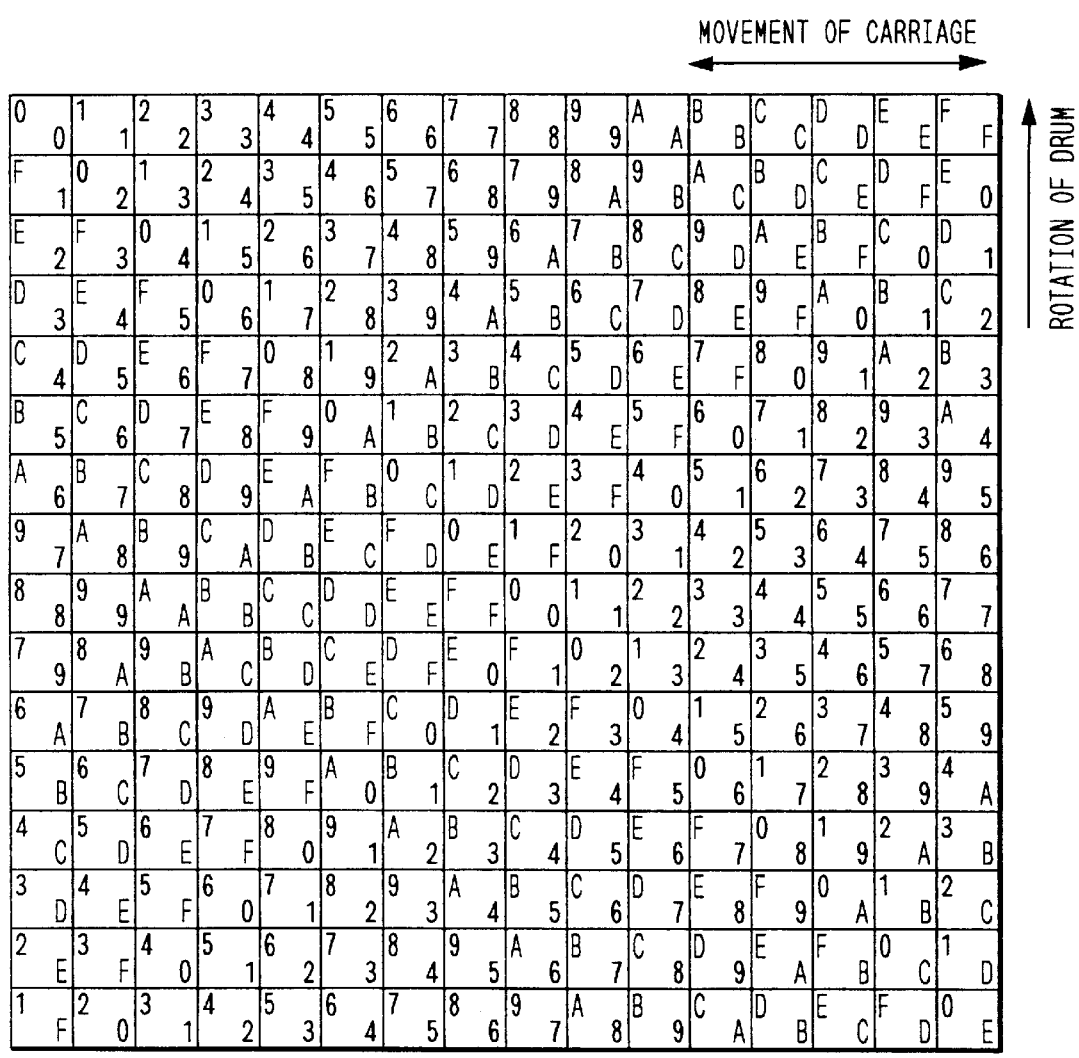
FIG. 9 shows an arrangement of discharge ports for recording data as pixels by a recording method of an Embodiment 2 of the present invention.
Figure 12:
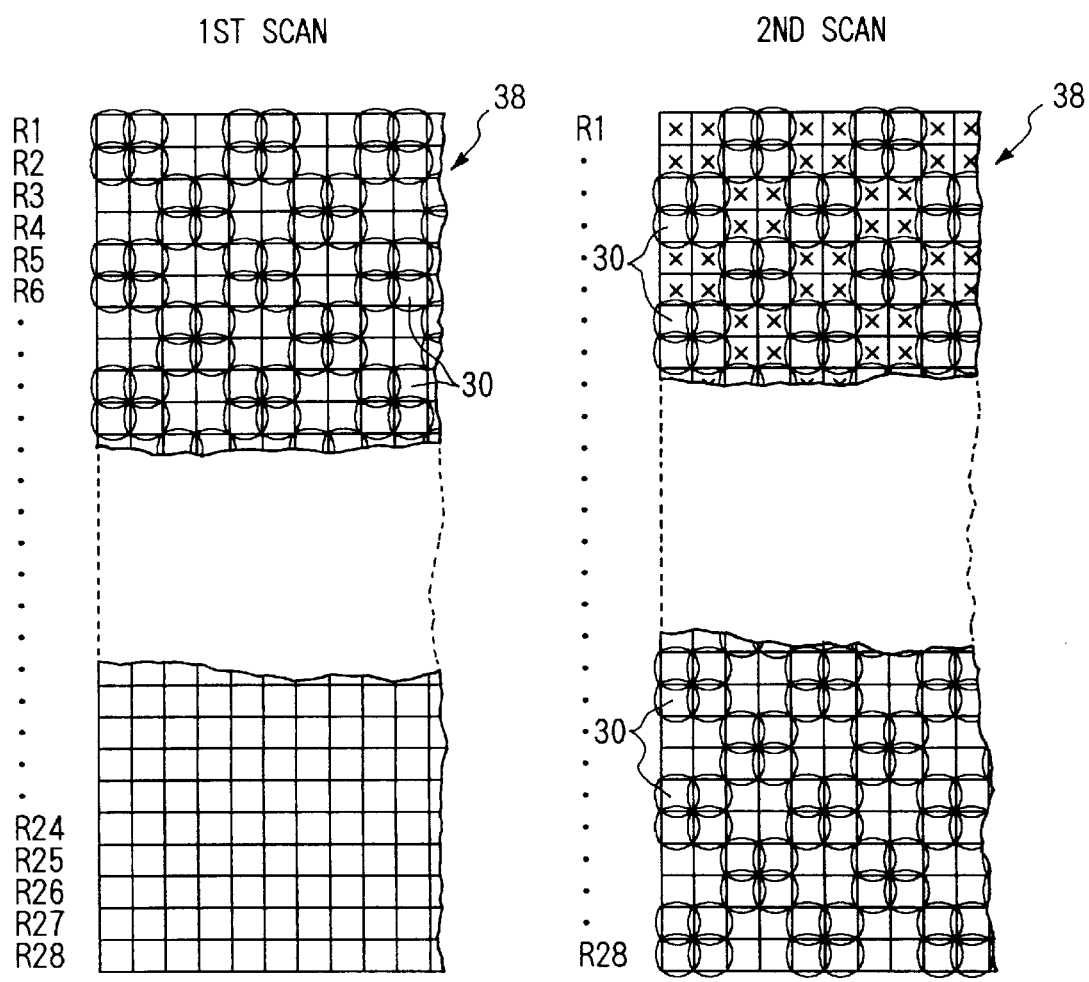
FIG. 12 illustrates a prior art recording method.
Figure 13:
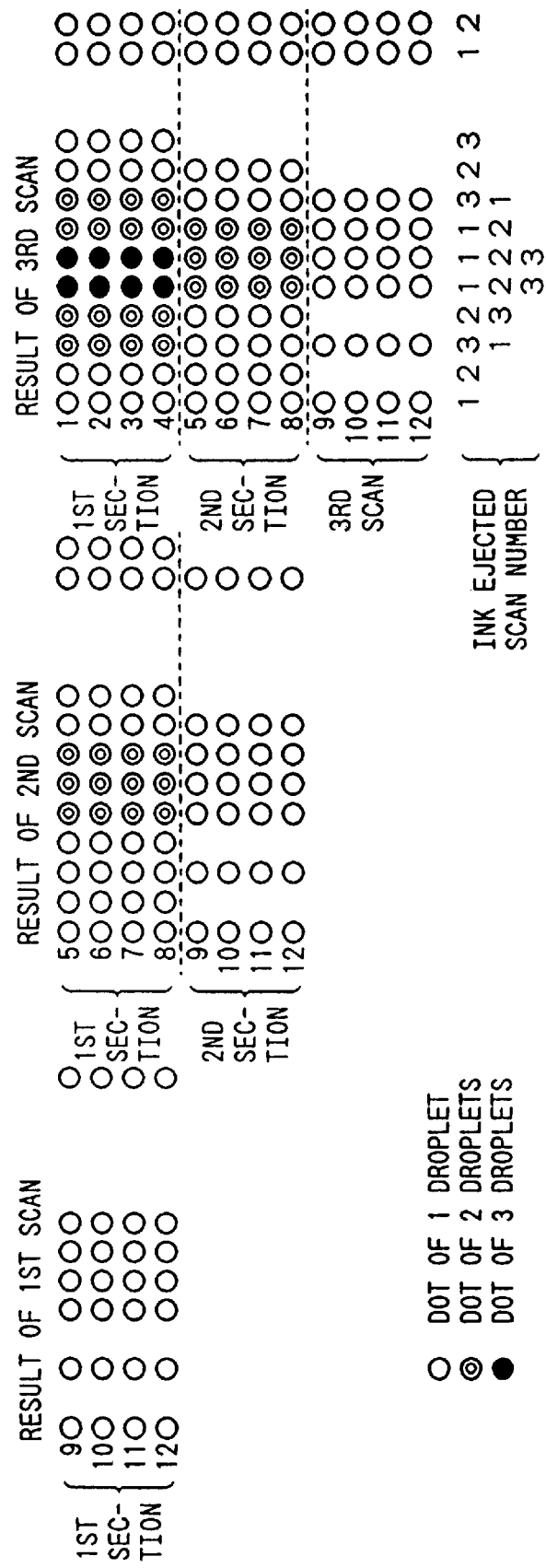
FIG. 13 illustrates another prior art recording method.

FIG. 9 shows a concept of the recording method of the present embodiment. Vertical and horizontal grids represent pixels arranged at a density of 16 pixels/mm. Reference numerals in FIG. 9 in the respective pixels show the discharge port numbers by which the pixels are recorded as in FIGS. 4A to 4C. The 16 discharge ports are designated by 0–F. In the present embodiment, since the record is made by using 0–2 ink droplets per pixel, two discharge ports are shown for each pixel.

In recording data, the entire image is read and it is processed by three tone levels at the pixel density of 16 dots/mm to divide the record data of the entire image into two images of record data. Namely, for the pixel which requires two ink droplets per pixel, the image data and the discharge ports required therefor are allotted to first and second images, and for the pixel which requires one ink droplet per pixel, the discharge ports are allotted to one of the first and second images. For the pixels which requires zero ink droplet per pixel, the discharge ports are not allotted to either of the first and second images. In this manner, the three-level image is divided into the two-level sub-images.

Like in the Embodiment 1, the drum is rotated such that the speed of the movement of the drum reaches 0.25 m/s and the record is made based on the image information of the first image (sub-image) while the recording head is moved from the leftmost end to the rightmost end of FIG. 1 at the carriage speed of 0.25 m/s. As a result, the record is made obliquely from the left top to the right bottom on the record sheet. When the head reaches the rightmost end of the drum, the direction of movement of the carriage is reversed and record is made based on the image information of the second image (sub-image) while the carriage is moved to the left at a speed of 0.25 m/s. As a result, the record is made on the record sheet in a direction crossing the direction of record in the first scan. In a similar manner, the first image is recorded in the scan from the left top to the right bottom, and the second image is recorded in the scan from the right top to the left bottom and it is repeated to record the entire image.

As a result, the pixels recorded are arranged as shown in FIG. 9. As seen from FIG. 9, the 16 sequential pixels in one line are formed by the ink droplets discharged from a different combination of all discharge ports of the recording head. As a result, the scatter in the direction of discharge and the amount of discharge of the ink droplets from each discharge port is completely averaged. Consequently, the reduction of the stripe and the irregularity is made sufficient and a high quality of record image is attained.

In the present embodiment, when the entire image data is allotted to the two image data, if the pixels which require on ink droplet per pixel sequentially appear in the 45° direction on the record sheet, it is preferable that they are recorded by different discharge ports. For example, the pixels which sequentially appear along the 45° line from the left top to the right bottom of FIG. 9 may be recorded by the combination of the discharge port #0 and the discharge ports #0, #2, #4, #8, #A, #C and #E, respectively, but when those pixels are to be recorded by one ink droplet, and if the droplets are allotted to only the first image, the record is made by only the discharge port #0 and an oblique stripe or irregularity may appear. In order to avoid stripe or irregularities, the image for the 45° pixels may be randomly allotted or allotted in accordance with the pixel positions (for example, the odd numbered pixels as counted obliquely are allotted to the first image and the even numbered pixels are allotted to the second image), but preferably the method of sequentially allotting the discharge ports to the two images as shown in U.S. patent application Ser. No. 894,555 is used.

In the present embodiment, 0–2 ink droplets per pixel are recorded to attain the three-level tone recording although more ink droplets may be used to attain multi-level tone recording. In this case, the third and subsequent ink droplets may be recorded in the same scan as that of the first and second ink droplets but the reduction of the stripe and the irregularity may be more effectively done by recording the third and subsequent ink droplets in the scan of different direction than that of the scan for the first and second ink droplets.

<Embodiment 3>

The present embodiment uses the identical apparatus to that of the Embodiment 1 except that the recording head is different from that of the Embodiment 1. The recording head used in the present embodiment has 8 discharge ports, a discharge port density of 8 ports/mm and a discharge frequency of 4 KHz.

FIGS. 10A to 10C show a concept of the recording method of the present embodiment. The reference numerals in FIGS. 10A to 10C represent the discharge ports by which the pixels on the record sheet are recorded as in FIGS. 4A to 4C. In the present embodiment, the recording head having the discharge port density of 8 ports/mm is used to attain interlaced recording at a pixel density of 16 pixels/mm.

In recording data, the entire image is read and processed at an image density of 16 dots/mm.

Then, the drum 3 is rotated such that the speed of the movement of the record sheet reaches 0.25 m/s and the recording head is moved at a carriage speed of 0.25 m/s from the leftmost end to the rightmost end of the drum 3 in FIG. 1 to record the entire line. Since the discharge port density of the recording head is 8 ports/mm, there is an image not recorded by the scan between the pixels recorded by the respective discharge ports. As a result, the pixels are recorded as shown in FIG. 10B.

When the recording head reaches the rightmost end of the drum 3, the direction of movement of the carriage 4 is reversed and record is made while the carriage is moved to the left at a speed of 0.25 m/s. As a result, as shown in FIG. 10C, the record is made on the record sheet to cross the direction of record in the first scan. When the recording head reached the leftmost end of the drum 3, the direction of movement of the carriage is reversed and the similar recording process is repeated to record the entire image. In the above recording, because of the relation between the discharge port density and the image density, the pixels formed in the scan directed from the left top to the right bottom and the scan directed from the right top to the left bottom are interlaced with each other.

As a result, the pixels recorded are arranged as shown in FIG. 10A. As seen from FIG. 10A, the pixels which form one line, either vertically or horizontally, are formed by the ink droplets discharged from all discharge ports of the recording head, and the scatter in the direction of discharge and the amount of discharge of the ink droplets from each discharge port is completely averaged. As a result, the reduction of the stripe and the irregularity is made sufficient and a high quality of record image is attained.

In the present embodiment, the record is made by interlacing the arrangement of the recording elements in the direction of the recording elements by the plurality of scans. Namely, the record is made by using sub-images having the image of the entire image allotted by alternate pixel in the direction of arrangement of the recording elements.

<Embodiment 4>

In the present invention, the identical apparatus to that of the Embodiment 1 is used except a different recording head is used. The recording head used in the present embodiment has 16 discharge ports, a discharge port density of 16 ports/mm and a discharge frequency of 4 KHz.

FIGS. 11A to 11C show a concept of the recording method of the present embodiment. The reference numerals in FIGS. 11A to 11C represent the discharge ports by which the pixels on the record sheet are recorded as in FIG. 3.

In recording data, the entire image is read and processed at the pixel density of 16 dots/mm. Then, the drum 3 is rotated such that the speed of movement of the record sheet 2 reached 0.25 m/s, and the recording head is moved at the carriage speed of 0.25 m/s from the leftmost end to the rightmost end of the drum 3 in FIG. 1 to record the image. In the odd numbered lines from the top of the record sheet, the pixels to be formed by the even numbered discharge ports 0–E are recorded, and in the even numbered lines, the pixels (sub-image) to be formed by the odd numbered discharge ports 1–F are recorded. As a result, the pixels are recorded as shown in FIG. 11B. In this record, the pixels are alternately formed in the direction of movement of the carriage.

When the recording head reaches the rightmost end of the drum, the direction of movement of the carriage is reversed and the record is made while the carriage is moved to the left at the speed of 0.25 m/s. In the odd numbered lines from the top of the record sheet, the pixels to be formed by the odd numbered discharge ports 1–F are recorded, and in the even numbered lines, the pixels (sub-image) to be formed by the even numbered discharge ports 0–E are recorded. The record is made for the pixels formed in the recording during the rightward movement of the carriage. Namely, the pixels are recorded as shown in FIG. 11C.

The above recording process is repeated to record the entire image. As a result the formed pixels are interpolated as shown in FIG. 11A. As seen from FIG. 11A, the pixels which form one line, either vertically or horizontally, are formed by the ink droplets discharged from all discharge ports of the recording head, and the scatter in the direction of discharge and the amount of discharge of the ink droplets from each discharge port is completely averaged. As a result, the reduction of the stripe and the irregularity is made sufficient and a high quality of image is attained. In the present embodiment, since the adjacent pixels are recorded with an interval, the ink droplets are easily absorbed by the record sheet and a clear image is produced.

In the present embodiment, the pixels are formed in each scan and they are later interpolated to complete the image. Namely, recording of one image is completed by using complementarily recorded sub-images.

The number of discharge ports of the recording head shown in the respective embodiments is merely illustrative and the respective embodiments may be operable whatever the number of discharge ports is, as seen from the description of the embodiments.

The record need not be done by the reciprocal movement of the carriage but the carriage may be moved in one direction and the direction of rotation of the drum may be reversed.

While the ink jet type recording apparatus is used in the respective embodiments, the present invention is applicable to other type of recording apparatus such as a thermal transfer type recording apparatus.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,470,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferable such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing a pressure wave of the thermal energy is formed corresponding to the ejecting portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the mountable recording head, it may be a single recording head corresponding to a single color ink, or may be plural recording heads corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been a liquid. It may be, however, an ink material which is solidified below the room temperature but liquified at the room temperature. Since the ink is controlled within the temperature not lower than 30° and not higher than 70° C. to stabilize the viscosity of the ink to provide the stabilized ejection in usual recording apparatus of this type, other inks may be used such that the ink is liquid within the temperature range when receiving the recording signal in the present invention. For example, the temperature rise due to the thermal energy is positively prevented by consuming it for the state change of the ink from the solid state to the liquid state. Another ink material is solidified when it is unused, to prevent the evaporation of the ink. In either of the cases, the application of the recording signal producing thermal energy, the ink is liquefied, and the liquified ink may be ejected. Another ink material may start to be solidified at the time when it reaches the recording material. The present invention is also applicable to such an ink material as is liquefied by the application of the thermal energy. Such an ink material may be retained as a liquid or solid material in holes or recesses formed in a porous sheet as disclosed in Japanese Laid-Open Patent Application No. 54-56847 and Japanese Laid-Open Patent Application No. 60-71260. The sheet is faced to electrothermal transducers. The most effective one for the ink materials described above is the film boiling system.

The ink jet recording apparatus may be used as an output terminal of an information processing apparatus such as a computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

In accordance with the present invention, there are regions in the recorded image which are recorded by non-parallel movements, and the arrangement of the recording elements used to record the pixels of one region is shifted from the arrangement of the recording elements used to record the pixels of another region. As a result, the number of different recording elements for sequentially or substantially sequentially recording the pixels in the given direction can be increased.

By appropriately setting the angle of successive recording directions as non-parallel, the given direction may be arbitrary.

As a result, the scatter in the recording property can be substantially averaged without reducing the recording speed and recording without substantial stripe and irregularity is attained.

What is claimed is:

1. A recording apparatus usable with a recording head having a plurality of recording elements for recording an image on a recording medium, said apparatus comprising:

drive means for driving the recording head relative to the recording medium;

dividing means for dividing image data to be recorded into a plurality of sub-images having mutually complementary relationships; and control means for controlling said drive means to drive the recording head a plurality of sets of times in corresponding sets of drive directions relative to the recording medium, at least one of the drive directions relative to the recording medium in a corresponding one of the drive sets being non-parallel to another of the drive directions relative to the recording medium in the corresponding one of the drive sets, and controlling the recording head such that the recording head records portions of the image in a plurality of non-parallel swaths for each corresponding one of the drive sets, wherein sub-images having complementary relationships are recorded in an area where the plurality of swaths cross by recording the sub-images during respective drives of the recording head, and driving of the recording head in one of the drive directions records one of the sub-images and driving of the recording head in another of the drive directions records a complementary sub-image.

2. A recording apparatus according to claim 1, wherein said control means controls said drive means to drive the recording head such that the drive directions in at least one of the corresponding drive sets are orthogonal to each other.

3. A recording apparatus according to claim 1, wherein said control means controls said drive means to drive the recording head such that at least one of the drive directions in the corresponding one of the drive sets is non-parallel and non-orthogonal to one side of the recording medium.

4. A recording apparatus according to claim 3, wherein said control means controls said drive means to drive the recording head such that an absolute value of an angle between one of the drive directions in a corresponding one of the drive sets and a side of the recording medium is equal to an absolute value of an angle of another of the drive directions in the corresponding one of the drive sets from the side of the recording medium.

5. A recording apparatus according to claim 4, wherein said control means controls said drive means to drive the recording head such that the drive directions in at least one of the corresponding drive sets are orthogonal to each other.

6. A recording apparatus according to claim 1, wherein the recording elements of the recording head generate bubbles in ink by using thermal energy and discharge the ink as the bubbles are generated.

7. A recording method for recording an image on a recording medium, said method comprising the steps of:

providing a recording head having a plurality of recording elements for recording the image;

dividing image data to be recorded into a plurality of sub-images having mutually complementary relationships; and moving the recording head relative to the recording medium a plurality of sets of times in corresponding sets of drive directions relative to the recording medium, at least one of the drive directions relative to the recording medium in a corresponding one of the drive sets being non-parallel to another of the drive directions relative to the recording medium in the corresponding one of the drive sets, and controlling the recording head such that the recording head records portions of the image in a plurality of non-parallel swaths for each corresponding one of the drive sets, wherein the sub-images having complementary relationships are recorded in an area where the plurality of swaths cross by recording the sub-images during respective movements of the recording head, and moving of the recording head in one of the drive directions records one of the sub-images and driving of the recording head in another of the drive directions records a complementary sub-image.

8. A recording method according to claim 7, wherein the recording head is moved such that the drive directions in at least one of the corresponding drive sets are orthogonal to each other.

9. A recording method according to claim 7, wherein the recording head is moved such that at least one of the drive directions in the corresponding one of the drive sets is non-parallel and non-orthogonal to one side of the recording medium.

10. A recording method according to claim 9, wherein the recording head is moved such that an absolute value of an angle between one of the drive directions in a corresponding one of the drive sets and a side of the recording medium is equal to an absolute value of an angle of another of the drive directions in the corresponding one of the drive sets from the side of the recording medium.

11. A recording method according to claim 10, wherein the recording head is moved such that the drive directions in a corresponding one of the drive sets are orthogonal to each other.

12. A recording method according to claim 7. wherein the recording elements of the recording head generate bubbles in ink by using thermal energy and discharge the ink as the bubbles are generated.

13. A recording apparatus usable with a recording head having a plurality of recording elements for recording an image on a recording medium, said apparatus comprising:
  dividing means for dividing image data to be recorded into a plurality of sub-images having mutually complementary relationships;
  scan means for scanning the recording head a plurality of sets of times in corresponding sets of drive directions relative to the recording medium, at least one of the drive directions relative to the recording medium in a corresponding one of the drive sets being non-parallel to another of the drive directions relative to the recording medium in the corresponding one of the drive sets, and controlling the recording head such that the recording head records portions of the image in a plurality of non-parallel swaths for each one of the corresponding drive sets; and
  control means for controlling said scan means to cause the recording head to completely record the image on the recording medium in an area where the plurality of swaths cross, wherein sub-images having complementary relationships are recorded in the area where the plurality of swaths cross by recording the sub-images during respective scans of the recording head, and wherein scanning of the recording head in one of the drive directions records one of the sub-images and scanning of the recording head in another of the drive directions records a complementary sub-image.

14. A recording apparatus according to claim 13, wherein said scan means scans the recording head such that the drive directions in a corresponding one of the drive sets are orthogonal to each other.

15. A recording apparatus according to claim 13, wherein at least one drive direction is non-parallel and non-orthogonal to one side of the recording medium.

16. A recording apparatus according to claim 15, wherein said control means controls said drive means to drive the recording head such that an absolute value of an angle between one of the drive directions in a corresponding one of the drive sets and a side of the recording medium is equal to an absolute value of an angle of another of the drive directions in the corresponding one of the drive sets from the side of the recording medium.

17. Recording apparatus according to claim 16, wherein said scan means scans the recording head such that the drive directions in a corresponding one of the drive sets are orthogonal to each other.

18. A recording apparatus according to claim 13, wherein said scan means comprises a carriage for moving the recording head and transport means for moving the recording medium.

19. A recording apparatus according to claim 13, wherein said transport means comprises a rotary drum supporting the recording medium.

20. A recording apparatus according to claim 13, wherein said control means interpolates an area where the plurality of swaths cross in each of the sets of scanning times in a different direction from a direction of arrangement of the plurality of recording elements to complete recording of the image.

21. A recording apparatus according to claim 17, wherein said control means conducts thinning recording in each of the sets of scanning times and interpolates the area where the plurality of swaths cross to complete recording of the image.

22. A recording apparatus usable with a recording head having a plurality of recording elements for recording an image on a recording medium, said apparatus comprising:
  dividing means for dividing image data to be recorded into a plurality of sub-images having mutually complementary relationships;
  scan means for scanning the recording head a plurality of sets of times in corresponding sets of drive directions relative to the recording medium, at least one of the drive directions relative to the recording medium in a corresponding one of the drive sets being non-parallel to another of the drive directions relative to the recording medium in the corresponding one of the drive sets, and controlling the recording head such that the recording head records portions of the image in a plurality of non-parallel swaths for each one of the corresponding drive sets; and
  control means for controlling said scan means to cause the recording head to completely record the image on the recording medium in an area where the plurality of swaths cross by recording the sub-images during respective scans of the recording head, and
  wherein said control means interpolates an interval of arrangement of the recording elements in a direction of arrangement of said recording elements in each of the sets of scanning times to complete recording of the image.

23. A recording apparatus according to claim 13, wherein said control means records the area where the plurality of swaths cross a plurality of times to complete a multi-level tone recording.

24. A recording apparatus according to claim 13, wherein the recording head discharges ink.

25. A recording apparatus according to claim 24, wherein the recording head discharges ink by using thermal energy.

26. A recording method for recording an image on a recording medium, said method comprising the steps of:
  providing a recording head having a plurality of recording elements;

recording a first swath by moving the recording head in a first direction relative to the recording medium;

recording a second swath in a non-parallel direction to the first swath by moving the recording head relative to the recording medium in a second direction non-parallel to the first direction, such that the first swath and the second swath cross; and dividing image data to be recorded in an area where the first swath and the second swath cross, the image data being divided into sub-images having mutually complementary relationships, wherein the sub-images are recorded in the area where the plurality of swaths cross by recording the sub-images during respective drives of the recording head, and wherein driving of the recording head in one of the drive directions records one of the sub-images and driving of the recording head in another of the drive directions records a complementary sub-image.

27. A recording method according to claim 26, wherein the first swath and the second swath cross orthogonally.

28. A recording method according to claim 26, wherein at least one of the first direction and the second direction are non-parallel and non-orthogonal to one side of the recording medium.

29. A recording method according to claim 28, wherein the recording head is moved such that an absolute value of an angle between the first direction and a side of the recording medium is equal to an absolute value of an angle between the second direction and the side of the recording medium.

30. A recording method according to claim 29, wherein the first direction is orthogonal to the second direction.

31. A recording method according to claim 26, further comprising the step of interpolating an interval of arrangement of the plurality of recording elements where the plurality of swaths cross in a different direction from a direction of arrangement of the plurality of recording elements to complete recording of the image.

32. A recording method according to claim 26, further comprising the step of thinning recording in each set of scans and interpolating an interval of arrangement of the plurality of recording elements where the plurality of swaths cross to complete recording of the image.

33. A recording method for recording an image on a recording medium, said method comprising the steps of:

providing a recording head having a plurality of recording elements;

recording a first swath by moving the recording head in a first direction relative to the recording medium;

recording a second swath in a non-parallel direction to the first swath by moving the recording head relative to the recording medium in a second direction non-parallel to the first direction, such that the first swath and the second swath cross; and dividing image data to be recorded in an area where the first swath and the second swath cross, the image data being divided into sub-images having mutually complementary relationships, wherein the image is completely recorded in the area where the first swath and the second swath cross by recording the sub-images during respective movements of the recording head, and further comprising the step of interpolating an interval of arrangement of the recording elements in a direction of arrangement of the recording elements to complete recording of the image.

34. A recording method according to claim 26, further comprising the step of recording the area where the plurality of swaths cross a plurality of times to complete multi-level tone recording.

35. A recording method according to claim 26, wherein the recording head discharges ink.

36. A recording method according to claim 35, wherein the recording head discharges ink by using thermal energy.

37. A recording method for recording an image on a recording medium, said method comprising the steps of:

providing a recording head having a plurality of recording elements;

dividing one image to be recorded on the recording medium into a plurality of sub-images; and recording each of the divided sub-images by scanning the recording head a plurality of sets of times in corresponding sets of drive directions relative to the recording medium, at least one of the drive directions relative to the recording medium in a corresponding one of the drive sets being non-parallel to another of the drive directions relative to the recording medium in the corresponding one of the drive sets, such that the recording head records portions of the image in a plurality of non-parallel sub-images and the image is completely recorded on the recording medium in an area where the plurality of non-parallel sub-images cross, wherein the sub-images have mutually complementary relationships and are recorded in the area where the plurality of swaths cross by recording the sub-images during respective scans of the recording head, and scanning of the recording head in one of the drive directions records one of the sub-images and scanning of the recording head in another of the drive directions records a complementary sub-image.

38. A recording method according to claim 37, wherein each sub-image of the plurality of sub-images is divided at a predetermined interval in a direction different from a direction of arrangement of the plurality of recording elements.

39. A recording method according to claim 37, wherein each sub-image of the plurality of sub-images is divided by complementary thinning.

40. A recording method according to claim 37, wherein each sub-image of the plurality of sub-images is divided at an interval corresponding to an interval of arrangement of the recording elements in a direction corresponding to a direction of arrangement of the recording elements.

41. A recording method according to claim 37, wherein each sub-image of the plurality of sub-images is divided into a two-level image from a multi-level image.

42. A recording method according to claim 37, wherein said recording head discharges ink.

43. A recording method according to claim 42, wherein said recording head discharges ink by using thermal energy.

* * * * *

UNITED STATES PATENT AND TRADEMARK OFFICE
CERTIFICATE OF CORRECTION

PATENT NO. : 6,012,798
DATED : January 11, 2000
INVENTOR(S) : Makoto Shioya

It is certified that error appears in the above-identified patent and that said Letters Patent is hereby corrected as shown below:

Column 13,
Line 28, "claim 7." should read -- claim 7, --.

Column 14,
Line 8, "Recording" should read -- A recording --; and
Line 24, "claim 17," should read -- claim 13, --.

Signed and Sealed this

Twenty-sixth Day of February, 2002

*Attest:*

*Attesting Officer*

JAMES E. ROGAN
*Director of the United States Patent and Trademark Office*